July 5, 1966 D. I. WELT 3,259,407
LOCK FOR TELESCOPING TUBES
Filed Aug. 28, 1963 2 Sheets-Sheet 1
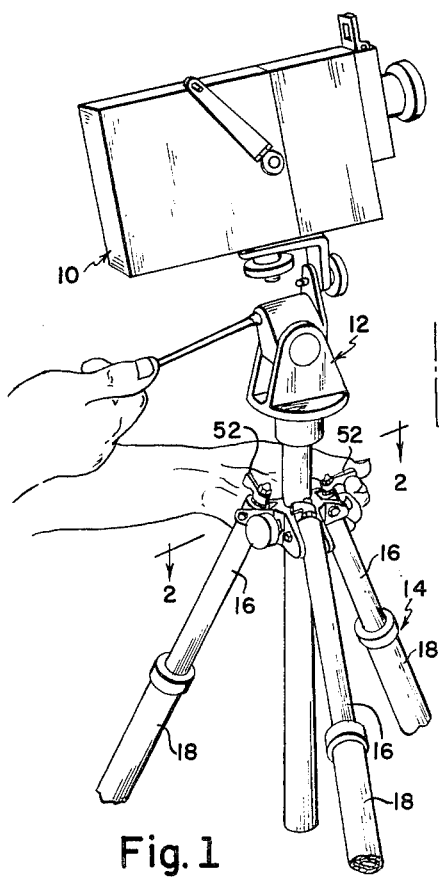
Fig. 1
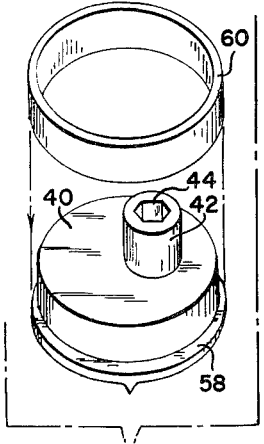
Fig. 8
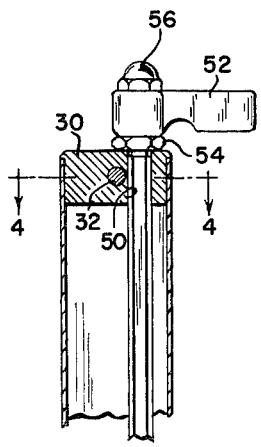
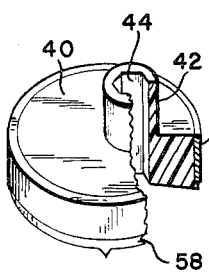
Fig. 9
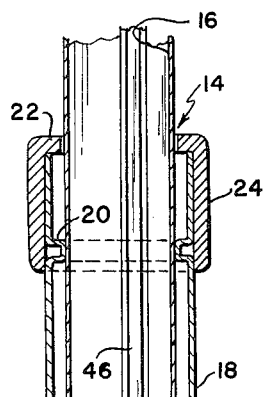
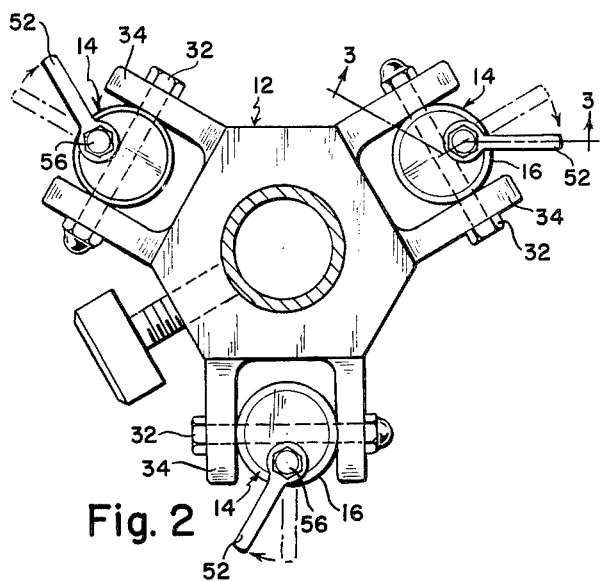
Fig. 2
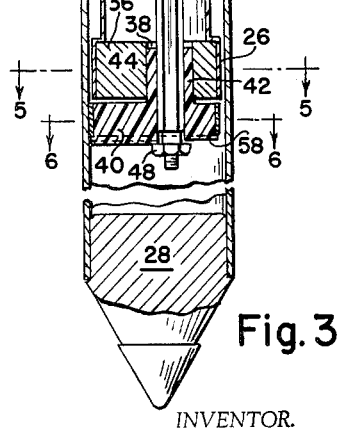
Fig. 3
INVENTOR.
DAVID I. WELT
BY John Cyril Malloy
ATTORNEY

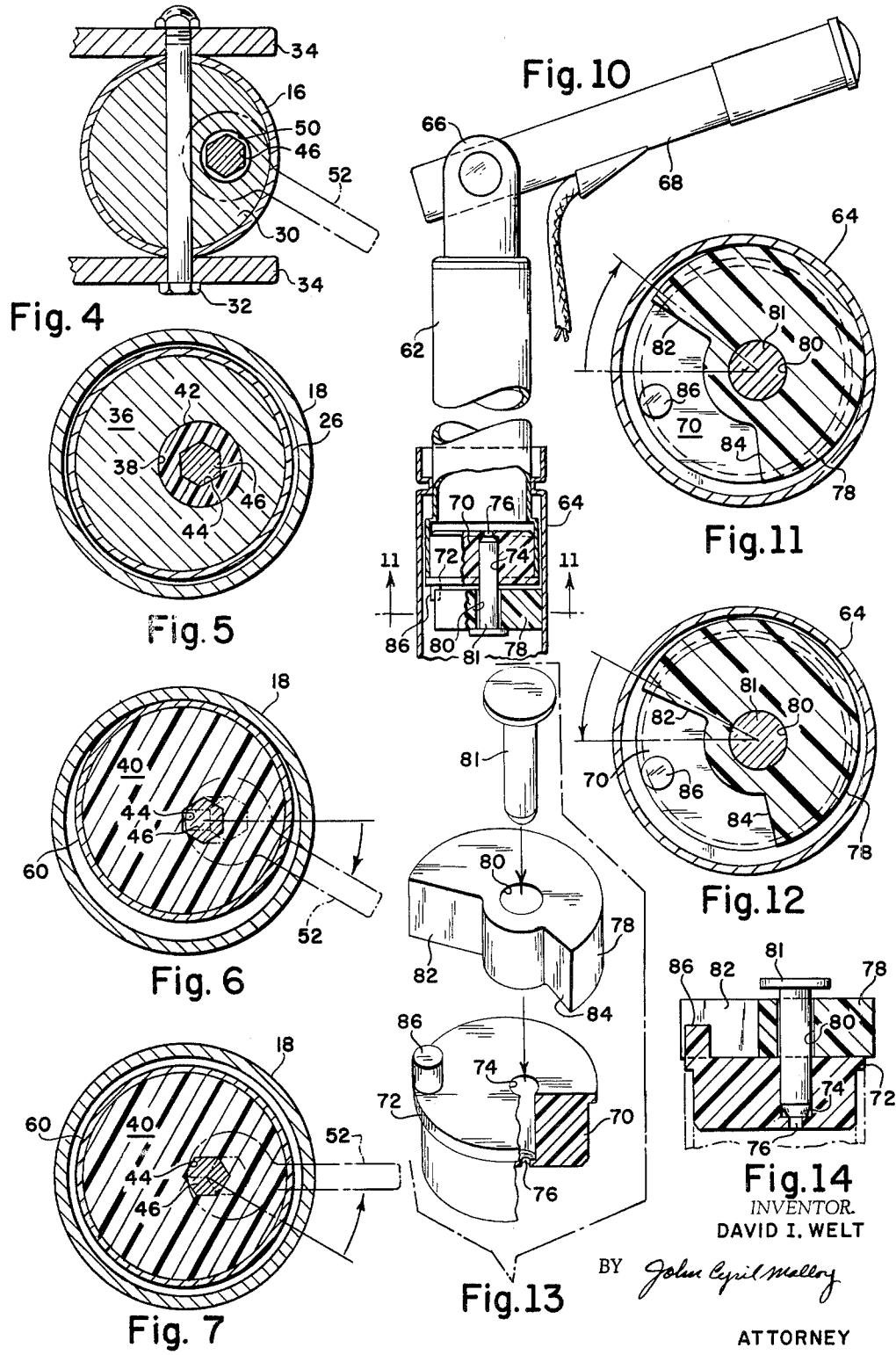

United States Patent Office 3,259,407
Patented July 5, 1966

3,259,407
LOCK FOR TELESCOPING TUBES
David I. Welt, Miami, Fla., assignor to Safe-Lock, Inc., Hialeah, Fla., a corporation of Florida
Filed Aug. 28, 1963, Ser. No. 305,104
6 Claims. (Cl. 287—58)

This invention relates to lock means for telescoping, tubular members, such as those used in tripods, for instance, or stands for microphones, or other devices where the length of a tubular member is subject to adjustment from time to time.

A general object of the invention is to provide a speedy locking system, with simplicity of construction, and endowed with positiveness in its action. Another object is to provide a lock means, the working parts of which are interiorly located, and thus removed from view or contact. A further object is to minimize jamming, especially in the unlocking action. Yet another object is to provide for uni-directional locking action. A still further object is to provide an improved locking device of the general type having an eccentric cam actuated by remote control. Other objects include the provision of a device which is easy of manufacture, and low in cost.

These and other objects, which will be apparent, are attained by the present invention, a preferred form of which is described in the following specification, as illustrated in the drawing, in which:

FIGURE 1 is a perspective view of a camera mounted on a tripod with locking means having external operating levers contemplated in one form of the invention, FIGURE 2 is a top plan view, in partial section, of the tripod of FIGURE 1, on enlarged scale, taken on the line 2—2 of FIGURE 1, FIGURE 3 is an axial sectional view through one of the tripod legs, taken on the planes of the staggered line 3—3 of FIGURE 2, FIGURES 4–6 are transverse sectional views through a tripod leg, taken, respectively, on the planes of the lines 4—4, 5—5 and 6—6, of FIGURE 3, FIGURE 7 is a view similar to FIGURE 6, showing an adjusted position of rotation of the locking eccentric, FIGURE 8 is a bracketed view, in perspective, of the eccentric cam of FIGURES 3 and 6, with the two parts thereof in exploded form, FIGURE 9 is a view similar to FIGURE 8, with the parts thereof assembled, FIGURE 10 is a fragmentary, and foreshortened, side elevational view, in partial, axial section, of a system comprising a microphone, mounted on a standard composed of telescoping tubes, and with a modified locking system, FIGURE 11 is a transverse sectional view, enlarged, taken on the plane of the line 11—11 of FIGURE 10, FIGURE 12 is a view similar to FIGURE 11, showing the eccentric cam in an adjusted position of rotation, FIGURE 13 is a bracketed view, enlarged, and in perspective, of the locking elements of the FIGURE 10, with the parts in exploded form; and FIGURE 14 is an axial sectional view through the parts of FIGURE 13, as assembled.

Referring to the drawings by characters of reference there is shown a camera 10, mounted on a tripod 12, having three identical, adjustable legs 14, one of which is illustrated in detail, in FIGURES 3–9. Legs 14 have the usual telescopic form, with an inner tube 16, and an outer tube 18, both of aluminum or other suitable material. As seen in FIGURE 3, inner tube 16 is substantially smaller in diameter than outer tube 18, and a minimized slide-bearing surface is attained by means of an inward annular crimp 20 in tube 18 near its open end, and snugly fitted on tube 16, as assisted by a radially inwardly extending flange 22, on a header sleeve, or ferrule 24, friction-fitted or otherwise secured on the tube, in covering relation to the crimp 20. The other, cooperating, slide-bearing surface is provided by a lower end portion 26, of enlarged diameter, snugly fitted in tube 18. At its lower end, tube 18 may be closed by a plug 28 having a conical, lower end, for ground anchorage, or a crutch tip as shown in that art. The upper end of tube 16 is closed by a plug 30 bored on a diametral line to receive a bolt 32, or pivot pin, by means of which it is swivelly mounted on ears 34 on the body of the tripod.

The locking mechanism is carried at the inner extremity of inner tube 16, with the basic, supporting element comprising a cylindrical plug 36, shown as of metal, but which may be composed of other material, such as nylon or the like, secured in the enlarged, lower end 26 of the tube, as by a press fit, crimping, or other suitable means. The plug 36 has an eccentric cylindrical bore 38, with axis parallel to the axis of the plug, the eccentricity being apparent in FIGURE 5. A cylindrical cam plug 40 (FIG. 8) of approximately the same diameter as plug 36, has a cylindrical boss 42 extending from one face, axially parallel with plug 40, of about the same eccentricity as plug 36, for arrangement of the cam plug in peripheral coincidence therewith, and sized for a snug, rotary mounting in the bore 38. The boss 42 has a through passage 44, of hexagonal section, for receiving a hexagonal operating rod 46, in keyed relation, which rod is retained by a nut 48 on the underside of cam plug 40, and passes upward through a suitable opening 50 in the upper plug 30, which is circular, to permit rotation of the rod, and is offset from the axis of plug 30 to enable the rod to clear the pivot pin 32. Rod 46, on its outer end, has an operating handle 52, secured by a lower nut 54, and an outer cap nut 56.

While it is possible to secure a locking action with a unitary cam plug, it has been found that much more superior results are attained if the cam plug is provided with a relatively thin sleeve, especially in the case where the sleeve is adapted for relative rotation of the plug. Thus, the plug 40, which is preferably formed from a tough, resilient plastic, such as nylon or the like, has a shouldered portion, or flange 58, at one end, receiving a ring or band 60, preferably of aluminum, which is snugly fitted on plug 40, preferably for relative rotation with respect thereto. The diameter of band 60 is about the same as enlarged end 26 of the inner tube, and is therefore capable of positioning in peripheral coincidence therewith.

As shown in FIGURE 3, the telescoping parts are locked, and the cam plug sleeve 60 is in contact with the inner wall of tube 18. Due to the yielding nature of the plug and the thin body of band 60, the zone of contact covers a substantial angular extent of the periphery of the cam plug, as seen in FIGURE 6. This is accomplished by swing of the external handle 52 through an angle indicated by the arrow in FIGURE 6, and upon reverse swing through this angle, as shown in FIGURE 7, the cam plug is removed from contact with the tube walls, and generally into concentricity with the tube 18. Although not shown in FIGURES 3 and 6, it will be understood that reaction forces will also urge enlarged end 26 of the inner tube into frictional engagement with tube 18, which will add to the frictional holding force.

In the use of a solid cam plug, with a relatively long operating rod, certain malfunctioning has been noted, especially in the unlocking process, wherein a considerable twist may be imparted to the operating rod, followed by a sudden release of the cam, accompanied by undue noise and objectionable abrupt, snap action of release. This is entirely eliminated when the band or sleeve is employed. It is also noteworthy that in the use of the solid plug, the tube being engaged by the cam is carried in rotation in the early stages of the locking action, whereas, in the employment of the thin, outer sleeve, the cam plug will rotate at all times in the sleeve, and the sleeve and outer tube will both remain stationary during the application of the wedging force.

The modification shown in FIGURES 10-14 is structurally related to the form in FIGURES 1-9 in that the rotary cam and its mounting plug, in each case, have through openings on the axes of the eccentric components. In the illustration of this modification, the tubes 62, 64 are similar to tubes 16 and 18, respectively, with inner, upper tube 62 having upstanding ears 66, swively mounting a microphone 68.

The fixed, nylon plug 70, like plug 36, is carried in an enlarged end of tube 62, but in this case has a peripheral flange 72, at its lower end, overlapping the lower edge of tube 62. Plug 70 has an eccentrically located bore 74, with a restricted bore 76 in its upper end, and a rotary cam disc 78, also of nylon, and in the form of a segment of a cylinder, of a diameter about equal to that of plug 70, also has an eccentric bore 80, with eccentricity the same as that of bore 74, so that the two plugs may be arranged in peripheral coincidence. A headed pin 81, loosely fitted in bore 80 of the cam rotor, and anchored in a friction fit in bore 74 of plug 70, serves as a rotor shaft for the cam. Rotor 78 has two radial surfaces 82, 84, defining terminal ends thereof, and plug 70 carries a depending, cylindrical boss, or pin, 86, which is interposed between surfaces 82 and 84, and constitutes a stop. As a matter of fact, the pin will act as a stop only in one direction of rotation of the cam, since the resilient, wedging action will do the stopping in the locking movement, and no positive stop should be permitted to interfere with or curtail this action. On the other hand, in the unlocking movement, the rotor is prevented by the stop pin from passing over into a wedging action in the opposite direction of rotation. The virtues of this uni-directional locking action are manifold, and inclusive of the fact that most people are addicted to the convention of the right hand screw, in rotary movements, and also the fact that a bi-directional action will often lead to tentative efforts in unlocking which may be expended in the wrong direction, and thus serve only to reinforce the locking hold.

Locking and unlocking of this modification are effected by relative rotation of tubes 62 and 64. Irrespective of the relative position of plug 70 and cam 78, a small degree of turning of the tubes will be accompanied by peripheral contact between cam 78 and tube 64, which, upon first contact, immediately results in seizure of the cam by the tube, and relative rotation between cam 78 and plug 70, which brings the eccentricity into play, with a wedging action, which thoroughly locks the tubes against axial movement. This locking is illustrated in FIGURE 11, wherein it will be seen that a substantial portion of the periphery of the cam has been forced into contact with tube 64, in the rotation of the cam in the direction indicated by the arrow. Reverse rotation of the parts, with the cam moving in the direction of the arrow in FIGURE 12, will relieve the wedging action until the peripheral contact is on the point of vanishing (FIG. 12), whereupon, the parts are again free for axial sliding movement. Any continued rotation in the direction of the arrow in FIGURE 12 will result in bringing surface 82 into contact with pin 86, at which point the two parts are concentric, and rotate together in this concentric relation due to the pin connection. Thus, no locking can take place in this direction, but a slight turn in the opposite direction will again lock the parts.

Referring to the headed pin 81, it may be threadably received in the bore 74.

While a certain, preferred embodiment has been shown and described, various modifications will be apparent, in the light of this disclosure, and the invention should not, therefore, be deemed as limited, except insofar as shall appear from the spirit and scope of the appended claims.

I claim:
1. In a telescoping tube system; an outer tube and an inner tube, said inner tube including a support element rigidly supported on the inner end and having an eccentric bore of an axis parallel to the central axis of the tube; a rotary cam including a resilient body and a relatively thin resilient metallic sleeve rotatably carried on its periphery, the body of said cam having an eccentric bore of common eccentricity to that of the element; and means in the bores to connect the cam exteriorly of the inner tube for movement of translation with said inner tube and for movement of rotation about the axis of alignment of said bores, the said cam being sized so as to be slideable in the outer tube and rotatable about the axis of alignment to a position wherein the body is rotatable in the sleeve and the sleeve is trapped between the body and the wall of the outer tube to a position of tight wedging relation of the body against the sleeve so that the cam restrains relative movement of the members.

2. In a telescoping tube system; an outer tube and an inner tube, said inner tube including a support element rigidly supported on the inner end and having an eccentric bore on an axis parallel to the central axis of the tubes; a cam of cylindrical form rotatably carried exteriorly of the inner tube by the element, said cam having a resilient outer surface, and having an eccentric bore of eccentricity common to that of the bore of said element; means carried in the bores to rotatably connect the cam to the inner tube, and operating means, operable exteriorly on the inner tube and having a driving connection with the cam to rotate said cam about the axis of alignment of the bores, said cam being of a cross-sectional area such that it is slideable in the outer tube when the cam is in a generally coincident position relative to the cross-sectional area of the outer tube and such that on rotation of the cam a portion of the surface of the cam is wedged into tight frictional engagement with and resiliently deformed against the wall of the outer tube to restrain relative movement of the tubes.

3. In a telescoping tube system; an outer tube and an inner tube, said inner tube including a support element rigidly supported on the inner end and having an eccentric bore on an axis parallel to the central axis of the tubes; a rotary cam having an eccentric bore of common eccentricity to that of the element, said cam having a resilient outer surface and including a boss rotatably extending into the bore of the element, said cam being sized so as to be rotatable in the bore of the element from a position in which it is slideable in the outer tube to a position in which the peripheral surface of the cam is in tight frictional engagement with the wall of the outer tube and the peripheral surface of the cam is resiliently deformed and wedged against said wall; and operating means carried by the inner tube including a driving connection with the cam for rotating the cam about the axis of the alignment of the bores into and out of the said positions, said operating means being operative exteriorly of the inner tube and connecting the cam to the inner tube for movement of translation with it relative to the outer tube.

4. In a telescoping tube system, an outer circular tube and an inner circular tube, said inner and outer tubes having relatively thin walls, said inner tube including a support element rigidly supported on the inner end of the inner tube and having an eccentric bore on an axis parallel to the main central axis of the tubes, and a cam of cylindrical form carried exteriorly by the support element for allowing a cam of maximum diameter to be utilized and rotatably connected to the element, said cam having an eccentric bore of eccentricity common to that of the bore of said element, means carried in the bores to rotatably connect the cam to the inner tube, and an elongate operating rod in the inner tube having a driving connection with the bore in the cam and operable exteriorly of the outer end of the inner tube to rotate said cam about the axis of alignment of the bores (a) from a position wherein the cam is slideable together with the inner tube in the outer tube (b) to a position with the peripheral surface of the cam in binding relation against the wall of the outer tube to restrain relative movement of the tubes.

5. In a locking mechanism in a pair of telescoping tubes including a cylindrical cam carried exteriorly on the inner end of the inner tube and rotatable about an eccentric axis into and out of a position of frictional binding relation with the wall of the outer tube to restrain relative movement of the tubes; the improvement which resides in the cam comprising a resilient plastic main body and a relatively thin metallic sleeve closely carried exteriorly on the cam body, said sleeve being rotatable on the peripheral surface of the cam, said cam being responsive to radial forces so as to yieldably deform on rotation of the cam to conform to the radius of curvature of the inner wall surface of the outer tube and define an enlarged zone of frictional contact, the said sleeve permitting rotation of the body in the sleeve to tightly wedge against the sleeve.

6. In a telescoping tube system; an outer tube and an inner tube, said inner tube including a support element rigidly supported on the inner end and having an eccentric bore of an axis parallel to the central axis of the tube; stop means on the support element extending outwardly from the inner end; a rotary cam having an eccentric bore of common eccentricity to that of the element connected to the element and rotatable about the axis of alignment of said bores, said cam having a resilient outer surface and a peripheral notch with the said means extending into the notch; means in the bores to connect the cam exteriorly of the inner tube for movement of translation with said inner tube and for relative movement of rotation about the axis of alignment of said bores between said cam and said element, the said cam being sized so as to be rotatable relative to the inner tube from a position wherein the inner tube is slideable in the outer tube with the stop means in the notch in abutting engagement with the cam to restrain relative movement between the cam and the inner tube in one direction of rotation to a position wherein the peripheral surface of the cam is resiliently deformed and wedged in tight frictional engagement with the wall of the outer tube to restrain relative movement of the tubes, said cam having substantially all of its mass disposed at one side of a diameter passing through said cam bore whereby rapid relative rotation between the outer and inner tubes and due to inertial forces on said cam mass causes the cam to bind on the inner surface of said outer tube.

References Cited by the Examiner
UNITED STATES PATENTS

| | | |
|---|---|---|
| 593,300 | 11/1897 | Knight. |
| 808,992 | 1/1906 | Lawson. |
| 2,432,059 | 12/1947 | Zipser. |
| 2,459,785 | 1/1949 | Allerton _____ 287—136 |
| 2,526,415 | 10/1950 | Refsdal. |
| 2,991,096 | 7/1961 | Davidson _____ 287—136 |
| 3,171,675 | 3/1965 | Calciano _____ 285—110 |

CARL W. TOMLIN, *Primary Examiner.*

I. B. TALTON, D. W. AROLA, *Assistant Examiners.*